United States Patent [19]

Adachi et al.

[11] Patent Number: 5,155,612
[45] Date of Patent: Oct. 13, 1992

[54] LIQUID CRYSTAL DISPLAY DEVICE WHICH LIGHT SHIELD

[75] Inventors: Masahiro Adachi; Nobuyoshi Nagashima; Eiichi Takahashi, all of Tenri; Yutaka Takafuji, Nara; Takao Nomura, Tenri; Shuhei Yasuda, Nara, all of Japan

[73] Assignee: Sharp Kabushiki Kaisha, Osaka, Japan

[21] Appl. No.: 534,884

[22] Filed: Jun. 8, 1990

[30] Foreign Application Priority Data

Jun. 9, 1989 [JP] Japan .................. 1-148038
Jun. 9, 1989 [JP] Japan .................. 1-148039

[51] Int. Cl.⁵ .............................. G02F 1/13
[52] U.S. Cl. ...................... 359/80; 359/82; 359/83
[58] Field of Search ............ 357/23.7, 4; 350/333, 350/334, 336, 343, 344, 332; 430/20; 428/1; 359/74, 80, 81, 82, 83, 87, 88

[56] References Cited

U.S. PATENT DOCUMENTS

| | | | |
|---|---|---|---|
| 3,947,090 | 3/1976 | Yaguchi et al. | 350/345 |
| 4,422,731 | 12/1983 | Droguet et al. | 350/344 |
| 4,640,581 | 2/1987 | Nakanowatari et al. | 350/336 |
| 4,643,526 | 2/1987 | Watanabe et al. | 350/332 |
| 4,697,885 | 10/1987 | Minowa et al. | 350/334 |
| 4,698,668 | 10/1987 | Milgram | 350/331 R |
| 4,722,593 | 2/1988 | Shimazaki | 350/336 |
| 4,761,058 | 8/1988 | Okubo et al. | 350/334 |
| 4,826,297 | 5/1989 | Kubo et al. | 350/334 |
| 4,832,455 | 5/1989 | Takeno et al. | 350/334 |
| 4,842,373 | 6/1989 | Tomofuji et al. | 350/336 |
| 4,878,738 | 11/1989 | Hanami | 350/334 |
| 4,896,946 | 1/1990 | Suzuki et al. | 350/334 |
| 4,961,630 | 10/1990 | Baron et al. | 350/334 |

FOREIGN PATENT DOCUMENTS

| | | | |
|---|---|---|---|
| 0224040 | 10/1986 | European Pat. Off. | 350/334 |
| 0301869 | 7/1988 | European Pat. Off. | 350/334 |
| 3606101 | 8/1987 | Fed. Rep. of Germany . | |
| 59-133527 | 7/1984 | Japan | 350/334 |
| 59-210419 | 11/1984 | Japan | 350/334 |
| 60-64325 | 4/1985 | Japan | 350/334 |
| 60-230120 | 11/1985 | Japan | 350/331 R |
| 62-134627 | 6/1987 | Japan | 350/344 |
| 62-188264 | 7/1987 | Japan | 350/339 F |
| 62-283320 | 12/1987 | Japan | 350/334 |
| 63-96628 | 4/1988 | Japan | 350/334 |
| 63-225227 | 9/1988 | Japan | 350/343 |
| 1-56416 | 3/1989 | Japan | 350/334 |
| 1-68725 | 3/1989 | Japan | 350/332 |
| 64-84286 | 3/1989 | Japan . | |
| 1-52538 | 5/1989 | Japan | 350/334 |

OTHER PUBLICATIONS

"A 10-inch Diagonal High-Resolution Active-Matrix Color LCD Module" in Proceedings of the SID by Niki, et al., vol. 29, No. 4, 1988, pp. 259-263.
"TFT Addressed Liquid Crystal Color Displays" in Hitachi Review by Suzuki, vol. 38, No. 2, Apr. 1989, pp. 109-113.

Primary Examiner—William Mintel
Assistant Examiner—Minhloan Tran
Attorney, Agent, or Firm—Birch, Stewart, Kolasch & Birch

[57] ABSTRACT

A transmission type or projection type liquid crystal display device includes a light source and an active matrix type liquid crystal display panel provided with a thin film transistor arrangement. A shielding film is included for cutting off light incident upon the thin film transistor arrangement from the light source. Electrode terminals of the liquid crystal display panel and outputs of driving LSI circuits are connected to each other by flexible substrates with the connected portions between the electrode terminals of the liquid crystal display panel and the flexible substrates protected by a connected portion protecting resin. The liquid crystal display device is further provided with a light shielding device for covering at least the protecting resin portion of the liquid crystal display panel, so as to prevent light of the light source from entering the region of the connecting portion protecting resin.

13 Claims, 8 Drawing Sheets

LIQUID CRYSTAL DISPLAY DEVICE WHICH LIGHT SHIELD

BACKGROUND OF THE INVENTION

1. Field of the Invention

The present invention generally relates to a liquid crystal display device, and more particularly, to a light shielding construction for protecting a thin film transistor against light projected onto a liquid crystal display panel to prevent deterioration of characteristics of the projection type liquid crystal display device using the thin film transistor, or of a transmission type liquid crystal display device with back-light illumination employing the thin film transistor means.

2. Description of the Background Art

In FIGS. 12 to 15, there is shown one example of a conventional liquid crystal display device employing a thin film transistor (referred to as a TFT-LCD hereinafter).

Figure 12:
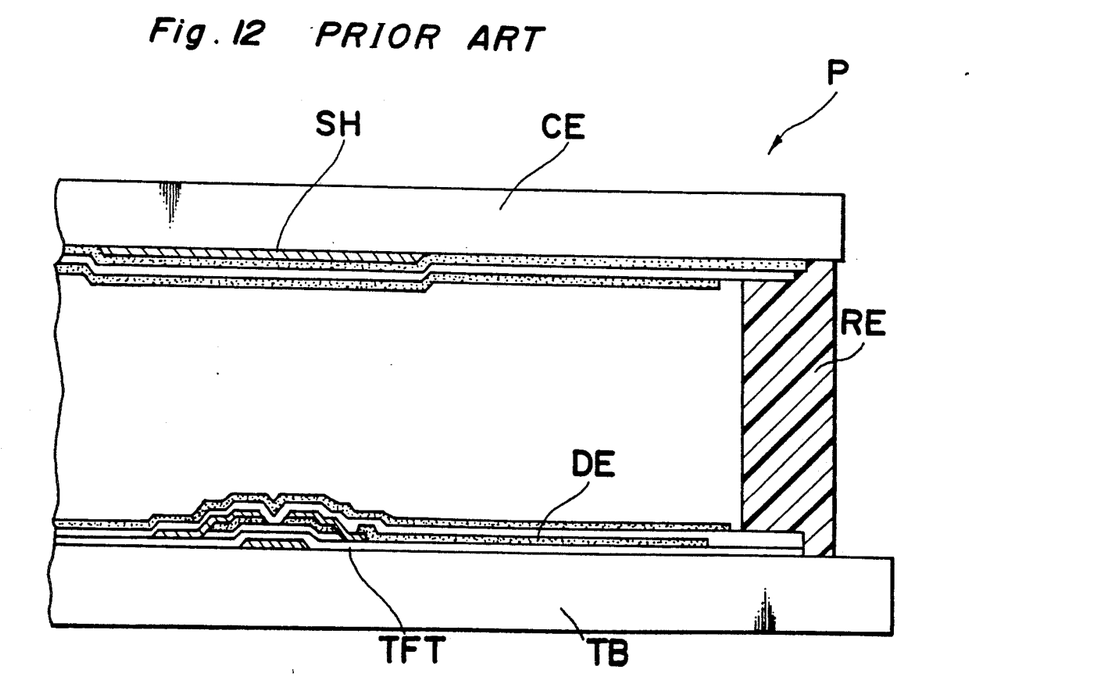
FIG. 12 is a view similar to FIG. 3, which particularly shows construction of a conventional liquid crystal display panel (already referred to)
Figure 13:
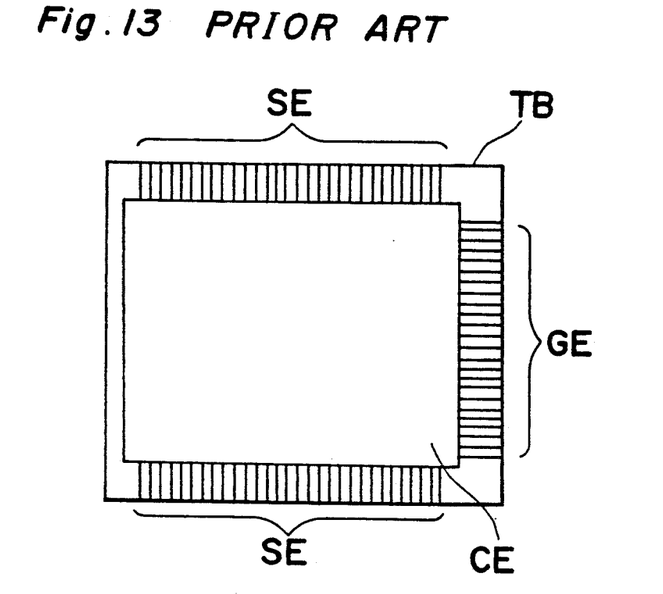
FIG. 13 is a top plan view of the liquid crystal display panel of FIG. 12 as viewed from its confronting substrate side (already referred to)

As shown in FIGS. 12 and 13, the thin film transistor liquid crystal display panel P (referred to as a TFT-LCD panel hereinafter) employed in the TFT-LCD includes a TFT array substrate TB formed with a TFT array TFT and a transparent display electrode DE, a counter substrate CE formed with a light shielding film SH for preventing light of a light source from entering the TFT and a transparent counter electrode, and a liquid crystal layer contained in a space between the substrates CE and TB bonded to each other by a sealing resin RE as illustrated.

As shown in FIG. 13, electrode terminals GE of gate electrode lines and electrode terminals SE of source electrode lines led out from an image area are provided on a peripheral portion of the TFT substrate TB.

For applying electrical signals to the above lines from a driving circuit (not particularly shown), flexible substrate FS-1, FS-2, and FS-3 mounted thereon with large scale integrated (LSI) circuits LS-1, LS-2 and LS-3 are connected to said electrode terminals GE and SE. Moreover, the connected portion between the flexible substrates LS-1 to LS-3 and the TFT substrate TB is covered by a white silicon mold resin RM for protecting the connected portion, and thus, a TFT-LCD unit is formed.

Figure 14:
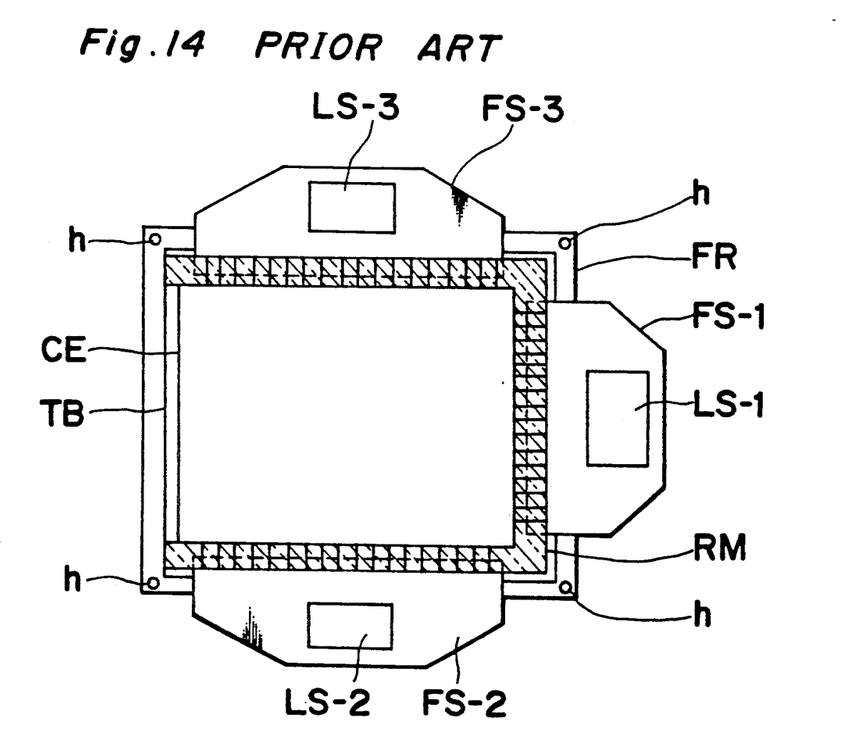
FIG. 14 is a view similar to FIG. 2, which particularly shows the conventional liquid crystal display unit employing the liquid crystal panel as shown in FIG. 12 (already referred to)
Figure 15:
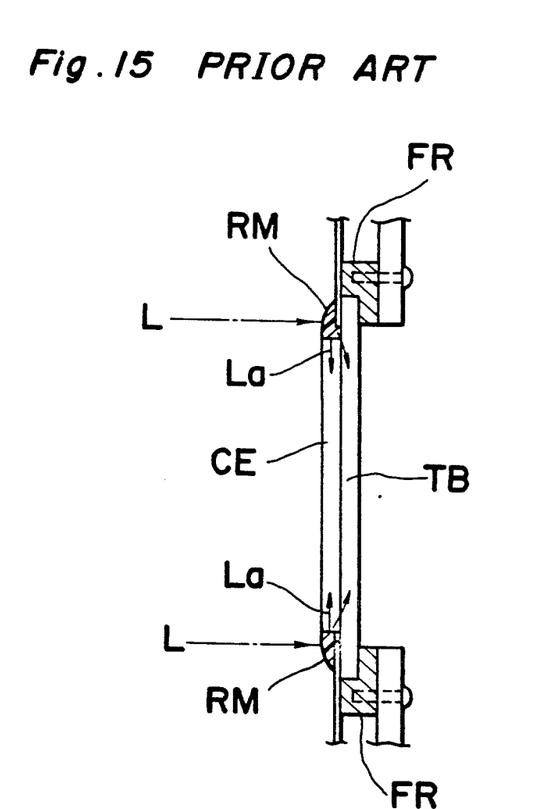
FIG. 15 is a view similar to FIG. 4, shown in the liquid crystal display unit of FIGS. 12 to 14 as mounted on a panel fixing plate (already referred to).

In FIG. 14 in which wiring patterns of the flexible substrates FS-1 to FS-3 are schematically shown for clarity, a frame FR formed with fixing holes h at its four corners is attached to the TFT-LCD panel P. Conventionally, such a TFT-LCD unit as described above is mounted on a projection optical system so as to be used as a projection type liquid crystal display device.

Commonly, a TFT-LCD employs a twisted nematic mode, with polarizing plates (not shown) disposed before and after the TFT-LCD panel. It has been clarified by the study of the present inventors, that in the above case, better display characteristics may be obtained when light from the light source is incident upon the TFT-LCD panel from the side of its confronting substrate.

However, when the optical system as described above is adopted, there has been such a disadvantage that, due to the fact that the mold resin RM for protecting the connected portion between the flexible substrates FS-1 to FS-3 and the TFT substrate TB referred to FIG. 14 is in conventionally, light La from the light source L incident upon the mold resin RM is scattered within said resin. The scattered light enters the interior of the TFT-LCD panel to be incident upon the TFT as indicated by arrows in FIG. 15, and by this scattered light, photo-conduction is generated in a semi-conductor film of the TFT, resulting in deterioration of switching characteristics of the TFT due to the light scattered by in the mold resin.

SUMMARY OF THE INVENTION

Accordingly, an essential object of the present invention is to provide a transmission type or projection type liquid crystal display device which is provided with a light shielding arrangement for preventing deterioration of characteristics of a TFT by protecting the TFT against the light projected onto an LCD panel.

Another object of the present invention is to provide a liquid crystal display device of the above described type which is simple in construction and of stable functioning with high reliability.

According to the present invention, the TFT-LCD is so arranged to cause light from a light source to be incident upon an LCD panel from the side of a confronting substrate of the LCD panel provided with black stripes, and in order to prevent such incident light from being projected onto the mold resin RM for protecting the connected portion of the flexible substrates, arrangements as follows are further made.

(i) Light shielding means for cutting off light incident upon the mold resin RM is provided in close contact with a light incident surface of the mold resin.

(ii) The mold resin RM is colored black by a pigment or dye to provide a light absorbing characteristic.

(iii) The mold resin RM is covered by a liquid crystal display panel fixing plate, to thereby isolate the mold resin from incident light.

More specifically, according to one aspect of the present invention, there is provided a transmission type or projection type liquid crystal display device, which includes a light source, and an active matrix type liquid crystal display panel provided therein with a thin film transistor and a shielding film for cutting off light incident upon the thin film transistor from the light source. Electrode terminals of the liquid crystal display panel and outputs of driving LSI circuits are connected to each other by flexible substrates, with the connected portions between the electrode terminals of the liquid crystal display panel and the flexible substrates being protected by a connected portion protecting resin. The liquid crystal display device is further provided with light shielding for covering at least the protecting resin portion of the liquid crystal display panel, thereby to prevent light of the light source from entering the region of the connecting portion protecting resin region.

In another aspect of the present invention, the transmission type or projection type liquid crystal display device includes a light source, and an active matrix type liquid crystal display panel provided therein with a thin film transistor and a shielding film for cutting off light incident light upon the thin film transistor from the light source. Electrode terminals of the liquid crystal display panel and outputs of driving LSI's are connected to each other by flexible substrates, with the connected portions between the electrode terminals of the liquid crystal display panel and said flexible substrates being protected by a connected portion protecting resin. The connected portion protecting resin is dispersed therein with a dye or pigment so as to be provided with a characteristic at least for absorbing visible light.

In a further aspect of the present invention, the transmission type or projection type liquid crystal display device includes a light source, and an active matrix type liquid crystal display panel provided therein with a thin film transistor and a shielding film for cutting off light incident upon the thin film transistor from the light source. The liquid crystal display device is further provided with light shielding for covering at least an entire portion of a region of sealing resin which retains a liquid crystal contained between two glass substrates constituting the liquid crystal display panel by bonding together the two glass substrates, thereby to prevent light of the light source from entering the resin of the sealing resin.

In still another aspect of the present invention, the transmission type or projection type liquid crystal display device includes a light source, and an active matrix type liquid crystal display panel provided therein with a thin film transistor and a shielding film for cutting off light incident upon the thin film transistor from the light source. The liquid crystal display panel includes two glass substrates bonded together by a sealing resin so as to hold liquid crystal therebetween. The sealing resin is dispersed therein with a dye or pigment so as to be provided with a characteristic at least for absorbing visible light.

By the arrangement of the liquid crystal display device according to the present invention as described above, it is possible to prevent the diffused light from the mold resin from entering the TFT, whereby deterioration of the switching characteristics of the TFT by the indirect incident light may be eliminated. Consequently, deterioration of the display characteristics of the transmission type or projection type liquid crystal display device can be prevented.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects and features of the present invention will become apparent from the following description taken in conjunction with the preferred embodiment thereof with reference to the accompanying drawings, which are given by way of illustration only, and thus are not limitative of the present invention, in which.

DETAILED DESCRIPTION OF THE INVENTION

Before the description of the present invention proceeds, it is to be noted that like parts are designated by like reference numerals throughout the accompanying drawings.

Figure 1:
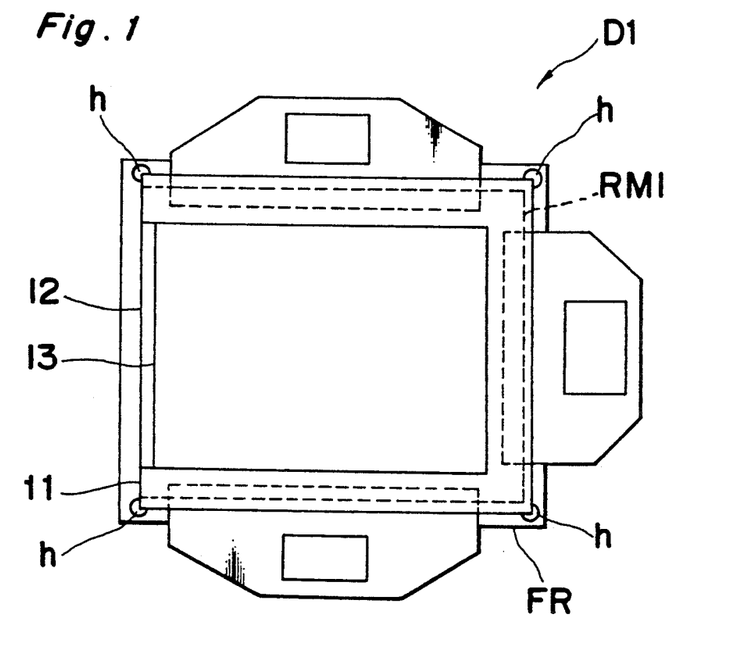
FIG. 1 is a top plan view of a liquid crystal display unit according to one preferred embodiment of the present invention as viewed from side of its confronting substrate.

Referring now to the drawings, there is shown in FIG. 1, a top plan view of a TFT-LCD unit D1 according to one preferred embodiment of the present invention including a TFT array substrate 12 and a counter substrate 13 in a rectangular configuration, as viewed from the side of counter substrate 13. In FIG. 1, a light shielding frame 11 of a generally U-shape is disposed on a mold resin RMl (FIG. 2) for protecting terminal connected portions of the TFT-LCD unit D1 to be described in more detail hereinafter. In the above embodiment, although an aluminum foil laminated with polyester is employed as a material of the light shielding frame 11, similar effect may be obtained even when the material for the light shielding frame 11 is replaced by a metallic sheet, metallic foil, a colored high polymer sheet or film, or color paper and the like.

Figure 2:
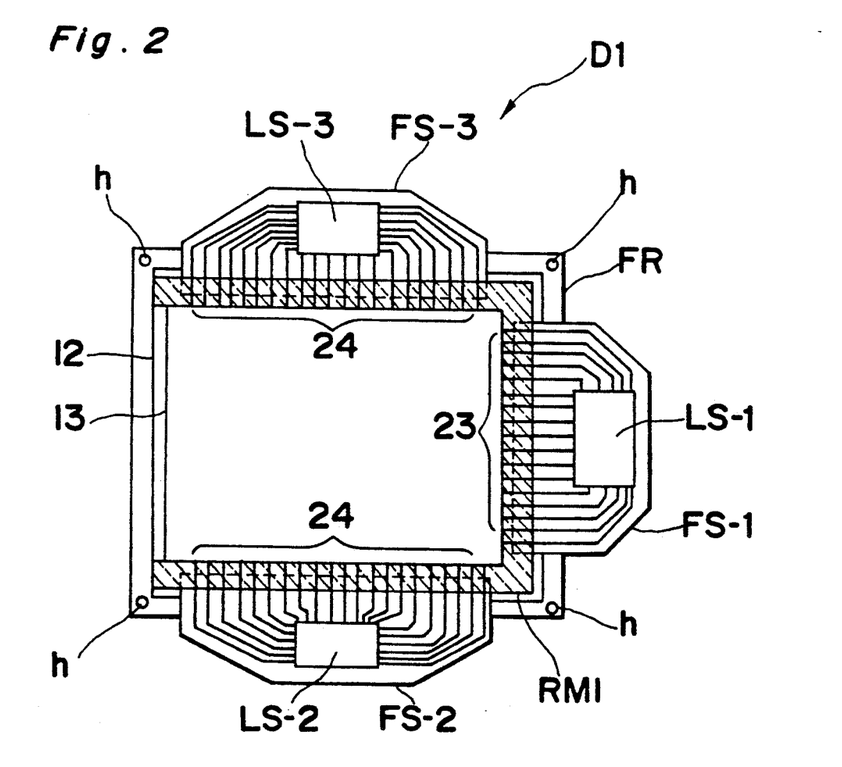
FIG. 2 is also a top plan view of the liquid crystal display unit of FIG. 1, with its light shielding frame being removed therefrom for clarity, and wiring patterns for flexible substrates thereof being schematically shown.

In FIG. 2, there is shown the TFT-LCD unit D1 in which the light shielding frame 11 is removed from the unit of FIG. 1 for clarity.

As shown in FIG. 2, at three peripheral edges of the TFT array substrate 12, electrode terminals 23 of the gate electrode lines, and electrode terminals 24 of the source electrode lines lead out from an image or screen area.

Flexible substrates FS-1, FS-2 and FS-3 mounted thereon with large scale integrated (LSI) LS-1, LS-2 and LS-3 are connected to the above terminals 23 and 24 for transmitting electrical signals from a driving circuit (not shown) to signal lines. The TFT-LCD unit D1 is further attached to a frame FR having fixing holes h at its four corners. In order to protect the connected portion between the flexible substrates FS-1, FS-2 and FS-3 and the TFT substrate 12, a white silicon resin is applied to the connected portion as the mold resin RM1 in manner similar as in the conventional arrangement of FIG. 14.

It is to be noted here that the wiring patterns for the flexible substrates FS-1,FS-2 and FS-3 in FIG. 2 and in the drawings thereafter are schematically shown in a simplified manner for clarity.

Figure 3:
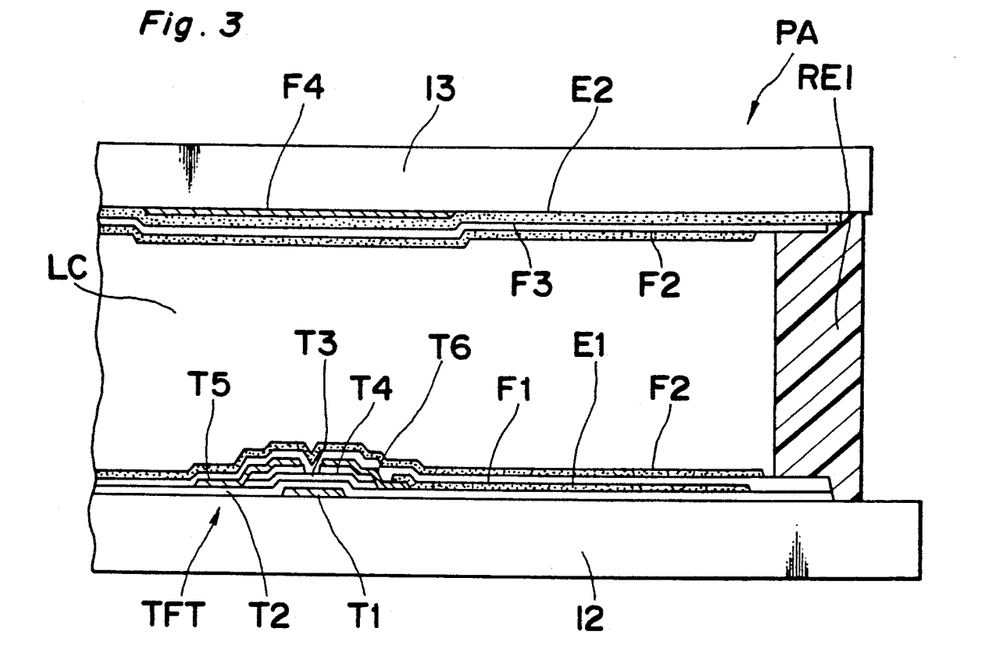
FIG. 3 is a fragmentary cross sectional view showing on a large scale, construction of a liquid crystal display panel for the display device of FIG. 1, FIG. 4, is a side elevational view, partly in section, showing the liquid crystal display unit of FIG. 1 as mounted on a panel fixing plate.

Reference is also made to FIG. 3 showing construction of a TFT-LCD panel PA for the unit D1 of FIG. 2.

The TFT-LCD panel PA in FIG. 3 generally includes the TFT array substrate 12 formed with a thin film transistor means TFT, the counter substrate 13, and a liquid crystal layer LC contained in the space between the substrates 12 and 13 bounded to each other at edge portions thereof by a sealing resin RE 1.

The thin film transistor means TFT includes a gate electrode T1, and a gate insulation film T2, an amorphous silicon layer T3, and n +amorphous silicon layer T4 successively laminated on the gate electrode T1, and is further formed with a source electrode T5 and a drain electrode T6. The TFT-LCD unit D1 utilizes the switching action of this thin film transistor means TFT so as to control signal voltage to be applied to the liquid crystal layer LC sealed in the space between a large number of picture element electrodes E1 and a counter electrode E2 in the image area, thereby to display images by retaining the voltage. The TFT-LCD panel PA in FIG. 3 further includes a passivation film Fl for protecting the thin film transistor means TFT, etc., orientation films F2 for orientation of liquid crystal molecules, the insulative substrates 12 and 13 of glass material or the like, a passivation film F3 for the counter electrode E2, and a light shielding film F4 for preventing light of the light source from entering the TFT.

Figure 4:
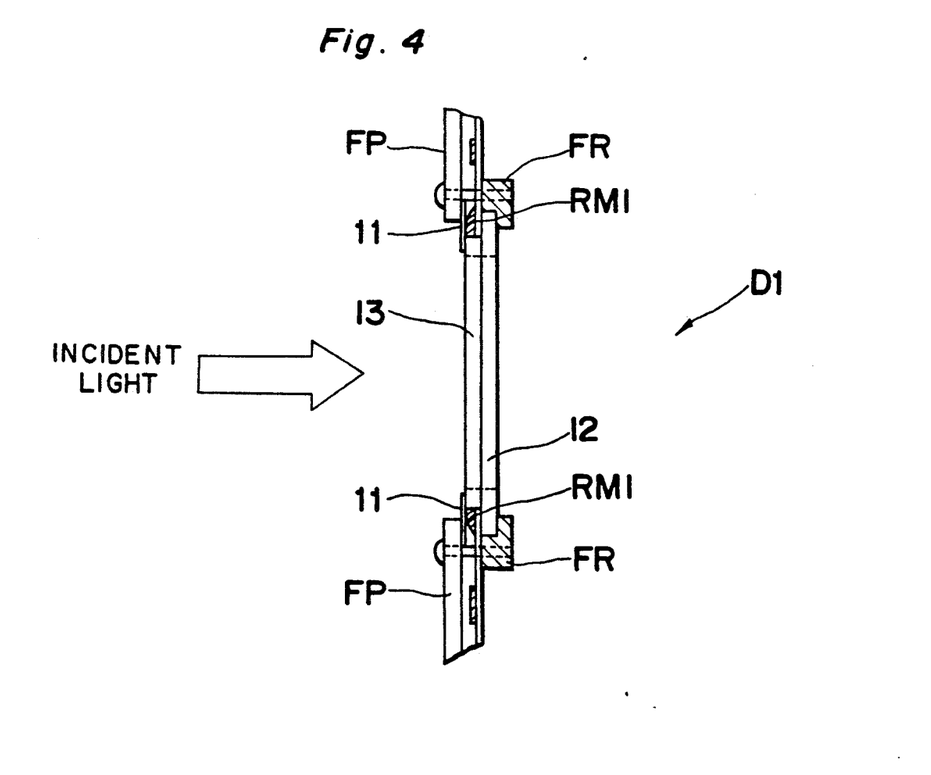

The TFT-LCD panel PA of FIG. 3 as described above is mounted on a panel fixing plate FP as shown in FIG. 4. In this case, the counter substrate 13 of the panel PA is directed towards the side of the panel fixing plate FP, and the light shielding frame 11 referred to earlier is provided to cover the portion of the terminal connected portion protecting mold resin RM1 as shown.

Figure 5:
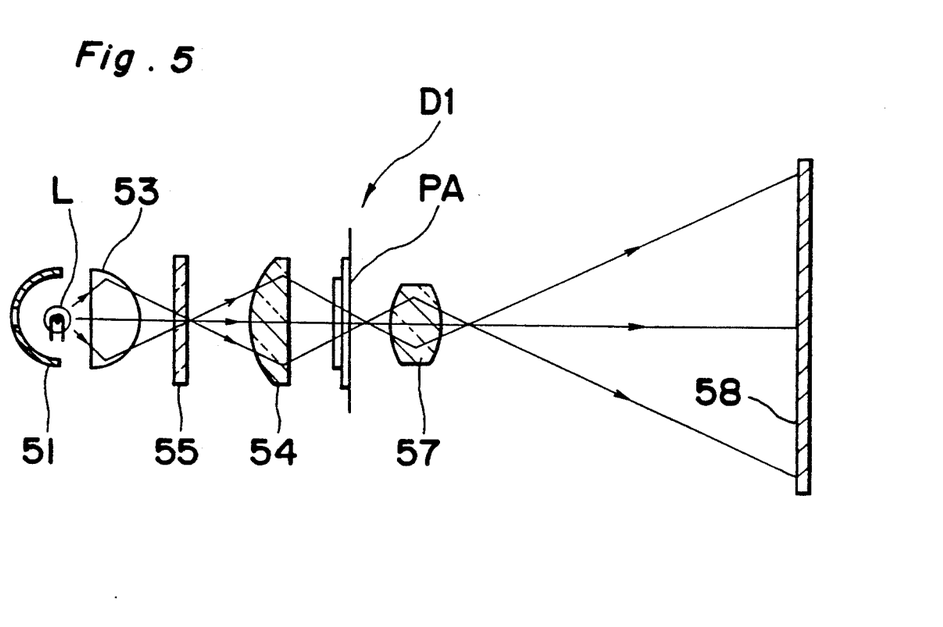
FIG. 5 is a schematic side sectional view showing general construction of a projection type liquid crystal display device which employs the liquid crystal display unit of FIG. 1.
Figure 6:
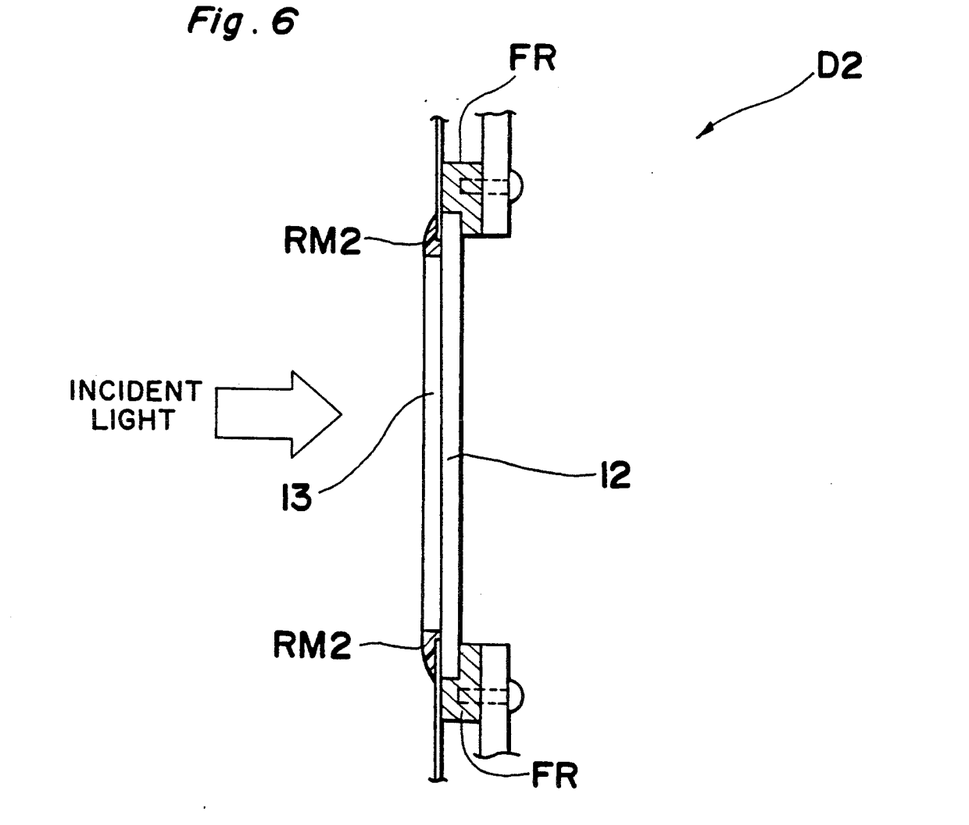
FIG. 6 is a view similar to FIG. 4 which particularly shows a modification thereof.
Figure 7:
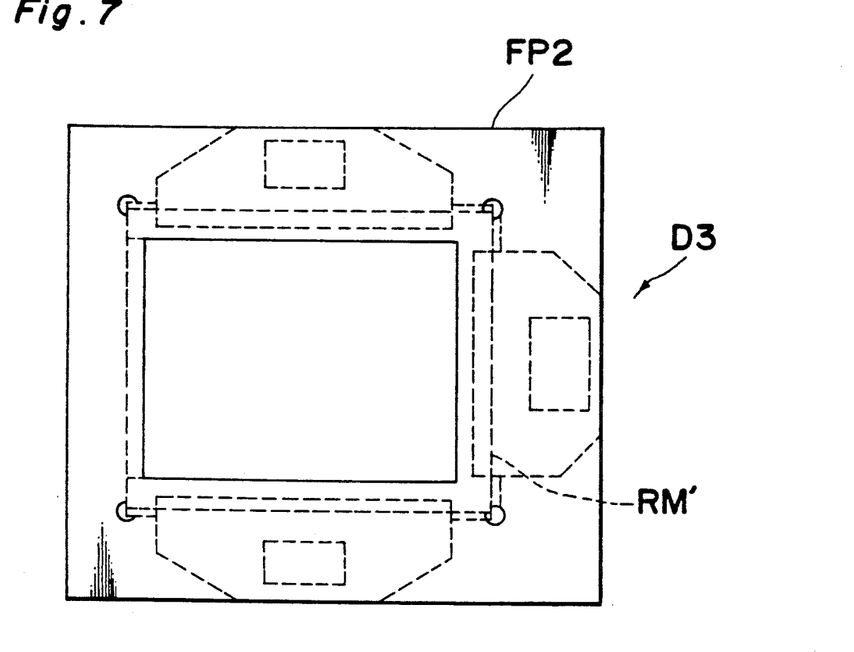
FIG. 7 is a view similar to FIG. 1, which particularly shows another modification thereof.

By using the TFT-LCD unit D1 as described so far, a projection type liquid crystal display device is constituted as shown in FIG. 5, which includes a lamp for the light source L, a condenser mirror 51 disposed behind the lamp, first and second condenser lenses 53 and 54 disposed subsequent to the lamp, and a heat ray and ultraviolet ray cut off filter 55 provided between the lenses 53 and 54. The TFT-LCD unit D1 with the LCD panel PA is disposed between the condenser lens 54 and a projection lens 57 for projection of the TFT-LCD unit image onto a screen 58. The TFT-LCD unit adopts the twisted nematic mode, with polarizing plates (not particularly shown) being disposed before and after the TFT-LCD panel. In the above case, the light from the light source L is arranged to be incident upon the TFT-LCD panel PA from the side of the counter substrate 13 thereof. FIG. 6 shows a modified TFT-LCD unit D2 of the TFT-LCD unit D1 in FIG. 4 according to the present invention. In the modified TFT-LCD unit D2 of FIG. 6, the mold resin RM2 for the protection of the terminal connected portion is colored in black by mixing a coloring agent into the silicon resin for the mold resin. For the coloring agent, carbon black can be employed. Besides the carbon black, even when pigments for red, green and blue are mixed for blackening, similar effects can be obtained. In this case, red iron oxide (red), chrome green (green), and ultramarine (blue) are used for the pigments. FIG. 7 shows another modification D3 of the TFT-LCD unit D1 of FIGS. 1 to 4.

In the modified TFT-LCD unit D3 of FIG. 7, a panel fixing plate FP2 for mounting the TFT-LCD unit onto the projection device is provided at the light incident side with respect to the TFT-LCD panel. An opening of the plate FP2 is set to be a size equal to the image area of the TFT-LCD panel, thereby to shield the portion of the mold resin RM' against light.

It should be noted here that the arrangements according to the present invention were effective not only in a projection type liquid crystal display device, but also in a transmission type active matrix liquid crystal display device illuminated by back-light.

As is seen from the foregoing description, according to the first embodiment of the present invention, a liquid crystal display device is provided with less deterioration of display characteristics and which is highly suitable for actual applications.

Figure 8:
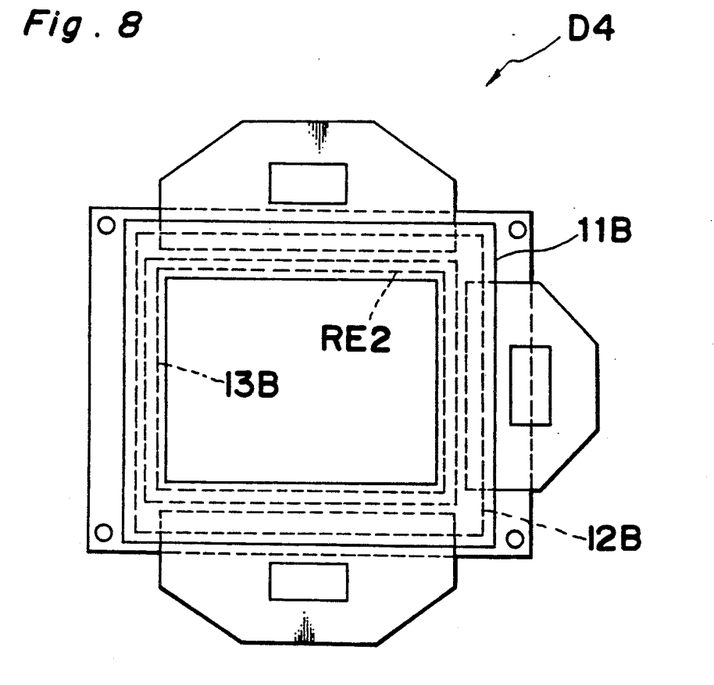
FIG. 8 is a top plan view of a liquid crystal display unit according to a second embodiment of the present invention as viewed from a side of its confronting substrate.
Figure 9:
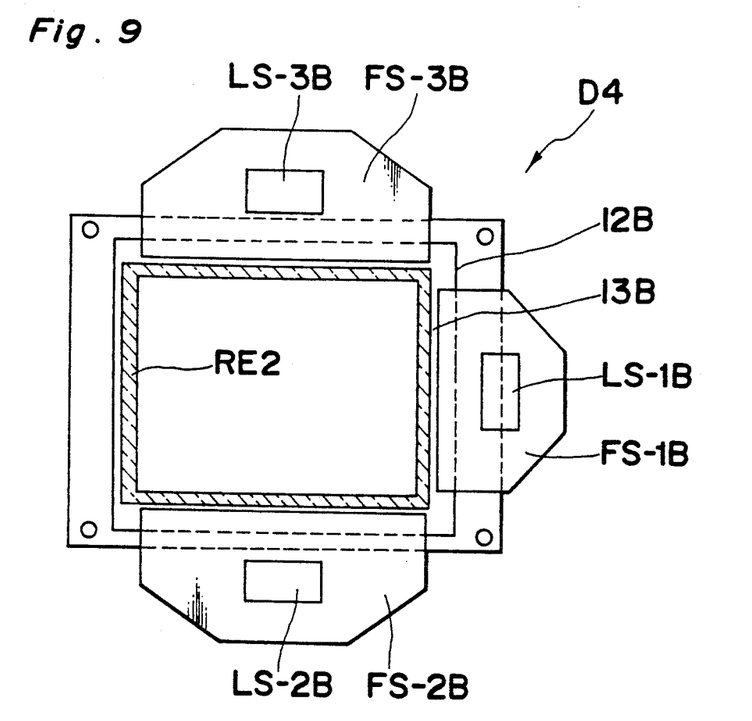
FIG. 9 is also a top plan view of the liquid crystal display unit of FIG. 8, with its light shielding frame 11B being removed therefrom for clarity.

Referring further to FIGS. 8 and 9, there is shown a TFT-LCD unit D4 according to a second embodiment of the present invention.

In FIG. 8 showing a top plan view of the TFT-LCD unit D4 as viewed from the side of its confronting substrate, there is provided a light shielding frame 11B of a closed rectangular shape which closely contacts the surface of the TFT-LCD panel at its light incident side, and which covers the entire sealing resin portion RE2 (FIG. 9) of the panel. In above embodiment, the aluminum foil laminated with polyester can be employed as material of the light shielding frame 11B, but a similar effect could be obtained even when the material of the light shielding frame 11B is replaced by a metallic sheet, metallic foil, a colored high polymer sheet or film, or color paper and the like as in the first embodiment.

FIG. 9 shows the TFT-LCD unit D4 in which the light shielding frame 11B is removed from the unit of FIG. 8 for clarity.

As shown in FIG. 9, at peripheral edges of the TFT array substrate 12B, electrode terminals of the gate electrode lines, and electrode terminals of the source electrode lines lead out from the image area.

Flexible substrates FS-1B, FS-2B and FS-3B mounted thereon with large scale integrated (LSI) circuits LS-1B, LS-2B and LS-3B are connected to the above terminals for transmitting electrical signals from a driving circuit (not shown) to signal lines.

Since the construction and function of the projection type liquid crystal display device to which the TFT-LCD unit D4 of the second embodiment as illustrated in FIGS. 8 and 9 may be applied, are exactly the same as those of the display device as explained with reference to FIG. 5 of the first embodiment, detailed description thereof is abbreviated here for brevity of explanation.

When the TFT-LCD unit D4 of FIGS. 8 and 9 are subjected to display experiments by the projection optical system of FIG. 5, favorable display can be achieved without lowering of image quality caused by deterioration of TFT-characteristics which conventionally takes place as a result of scattering light incident from the sealing resin.

As stated earlier, metallic sheets including aluminum sheets, colored paper, colored plastic sheets, colored high polymer films or compound materials thereof can be employed with equal effects.

Figure 10:
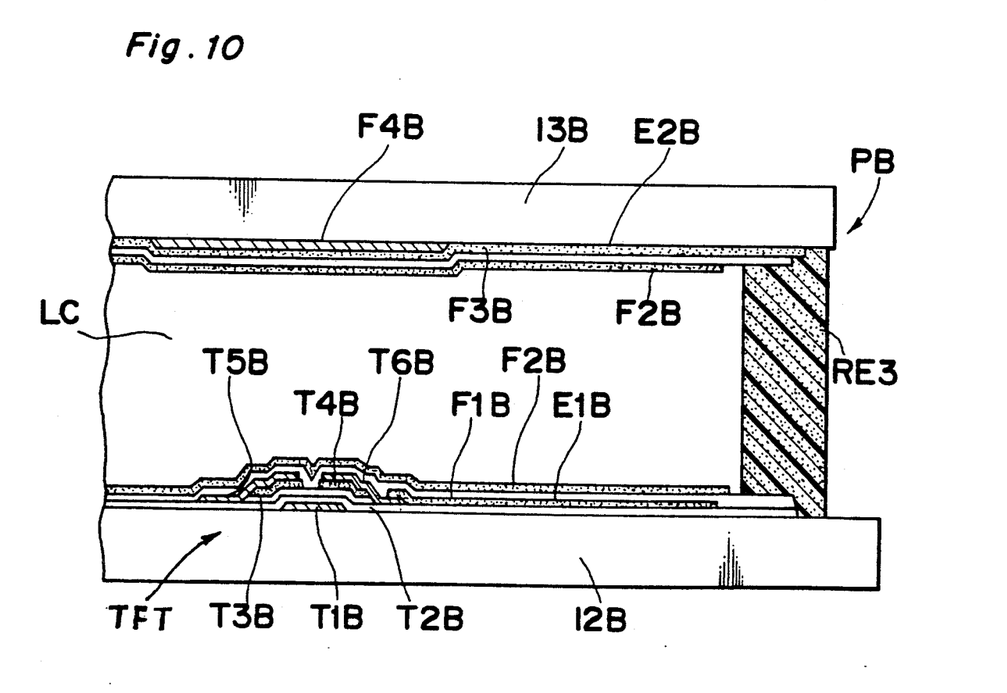
FIG. 10 is a fragmentary cross sectional view showing on a large scale, construction of a liquid crystal display panel for a modification of a second embodiment of the present invention of FIG. 8.

FIG. 10 shows a fragmentary cross section of a TFT-LCD panel PB as one modification of the arrangement for the second embodiment of FIGS. 8 and 9.

The TFT-LCD panel PB in FIG. 10 includes TFT array substrate 12B formed with the thin film transistor TFT, the counter substrate 13B, and the liquid crystal layer LC contained in the space between the substrates 12B and 13B bonded to each other at edge portions thereof by the sealing resin RE3.

In the TFT-LCD panel PB in FIG. 10, a coloring agent is mixed into an epoxy resin of the sealing resin RE3 of the panel PB so as to color the sealing resin RE3 black, by using carbon black as the coloring agent.

The thin film transistor TFT also includes a gate electrode T1B, and a gate insulation film T2B, an amorphous silicon layer T3B, and n + amorphous silicon layer T4B successively laminated on the gate electrode T1B, and is further formed with a source electrode T5B and a drain electrode T6B in the similar manner as in the panel PA described earlier with reference to FIG. 3. The TFT-LCD unit utilizes the switching action of this thin film transistor TFT so as to control signal voltage to be applied to the liquid crystal layer LC sealed in the space between a large number of picture element electrodes E1B and a counter electrode E2B in the image area to, thereby display images by retaining the voltage. The TFT-LCD panel PB in FIG. 10 further includes a passivation film F1B for protecting the thin film transistor TFT means, etc., orientation films F2B for orientation of liquid crystal molecules, the insulative substrates 12B and 13B of glass material or the like, a passivation film F3B for the counter electrode E2B, and a light shielding film F4B for preventing light of the light source L from entering the TFT.

When the TFT-LCD panel PB of FIG. 10 is subjected to display experiments by the projection optical system of FIG. 5, favorable display can be achieved without lowering of image quality caused by deterioration of TFT characteristics which conventionally takes place as a result of scattering light incident from the sealing resin.

Although carbon black was employed as the coloring agent for the sealing resin RE3, even when pigments of red, green and blue are mixed for blackening, similar effects can be obtained. In this case, red iron oxide (red), chrome green (green), and ultramarine (blue) are used for the pigments.

Figure 11:
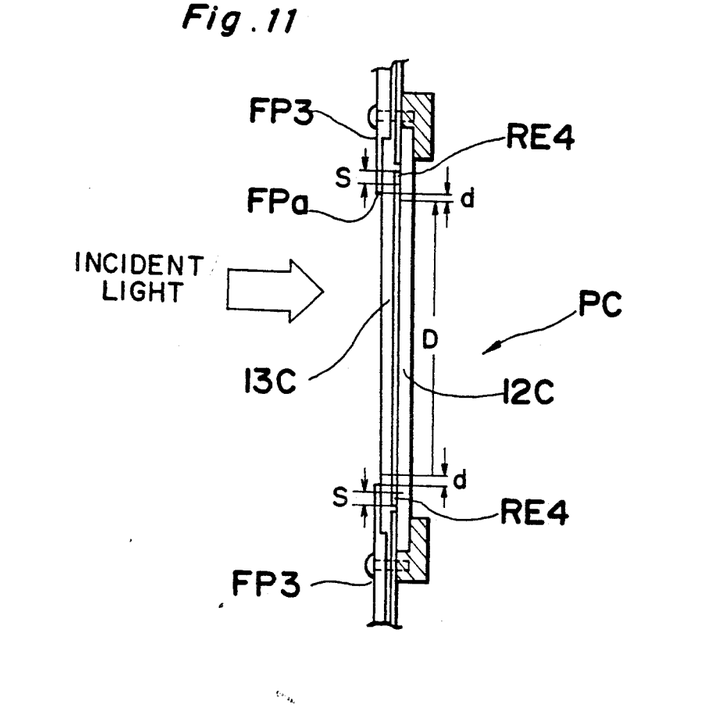
FIG. 11 is a side elevational view, partly in section, showing a liquid crystal display panel mounted on a panel fixing plate as another modification of the second embodiment of FIG. 8.

It is needless to say that, in the above arrangement, the sealing resin RE3 is not limited to be of epoxy resin, but similar effect may also be achieved even when bonding agents of silicon resin, acrylic resin and the like are employed, and that the pigment is not limited to that of the present embodiment, but a resin colored by a dye may also provide similar effect. FIG. 11 shows another modification of the arrangement for the second embodiment of FIGS. 8 and 9.

In FIG. 11, the TFT-LCD panel PC having construction generally similar to that of the panel PA in FIG. 3 and including the counter substrate 13C and the TFT substrate 12C bounded to each other by the sealing resin RE4 is attached by a fixing plate FP3 for mounting there of onto the projecting device at its light incident side. An opening portion FPa of the fixing plate FP3 is formed to be slightly larger than a display area D of the panel by a margin d so that the fixing plate FP3 may cover the entire region S of the portion of the sealing resin RE4 for the panel PC, thereby to shield the resin RE4 from light.

When the TFT-LCD of FIG. 11 is subjected to display experiment by the projection optical system of FIG. 5, favorable display can be achieved without lowering of image quality caused by deterioration of TFT characteristics conventionally takes place as a result of scattering light incident from the sealing resin.

As is clear from the foregoing description, according to a second embodiment of the present invention, a liquid crystal display device with less deterioration of display characteristics and which is highly suitable for actual applications may be provided.

Although the present invention has been fully described by way of example with reference to the accompanying drawings, it is to be noted here that various change and modifications will be apparent to those skilled in the art. Accordingly such changes and modifications from a scope of the present invention are are intended to be construed as included within the scope of the following claims.

What is claimed is:

1. A transmission type liquid crystal display device comprising:
    a light source for illuminating the display device; and
    an active matrix type liquid crystal display panel for displaying an image comprising
        thin film transistor means for controlling voltage applied to a liquid crystal layer of said liquid crystal display panel,
        a shielding film for cutting off light incident upon said thin film transistor means from said light source, and
        two glass substrates bonded together by a sealing resin for containing liquid crystal therebetween with said shielding film and said thin film transistor means formed respectively on inner surfaces said first two glass substrates, a dye or pigment being dispersed within said sealing resin so as to absorb visible light to prevent the visible light from entering the liquid crystal.

2. The transmission type liquid crystal display device of claim 1, further comprising light shielding means for covering said sealing resin to prevent incident light from entering said liquid crystal display panel through said sealing resin.

3. A projection type liquid crystal display device comprising:
    a light source for illuminating the display device; and
    an active matrix type liquid crystal display panel for displaying an image comprising
        thin film transistor means for controlling voltage applied to a liquid crystal layer of said liquid crystal display panel,
        a shielding film for cutting off light incident upon said thin film transistor means from said light source, and
        two glass substrates bonded together by a sealing resin for containing liquid crystal therebetween with said shielding film and said thin film transistor means formed on inner surfaces of said two glass substrates, a dye or pigment being dispersed within said sealing resin so as to be absorb visible light to prevent the visible light from entering the liquid crystal.

4. An electro-optical apparatus comprising:

a liquid crystal display panel for displaying an image, comprising first and second substrate bonded together by sealing resin with liquid crystal disposed therebetween;

electrodes, mounted on an outer periphery of said first substrate which extends beyond said second substrate, for supplying driving signals from LSI circuits to thin film transistor means mounted on an inner surface of said first substrate confronting said second substrate, said LSI circuits mounted on flexible substrates attached to said first substrate;

protecting resin for covering and protecting said electrodes mounted on said outer periphery of said first substrate; and light shielding means for covering said protecting resin to prevent incident light from entering said liquid crystal display panel through said protecting resin, said light shielding means comprising a U-shaped shield.

5. The electro-optical apparatus of claim 4, said U-shaped shield comprising aluminum foil laminated with polyester.

6. The electro-optical apparatus of claim 4, said U-shaped shield comprising colored high polymer film.

7. The electro-optical apparatus of claim 4, further comprising a light source for generating said incident light wherein the electro-optical apparatus is a projection type liquid crystal display device.

8. The electro-optical apparatus of claim 4, further comprising a back-light illumination source for generating said incident light wherein the electro-optical apparatus is a transmission type liquid crystal display device.

9. An electro-optical apparatus comprising:

a liquid crystal display panel for displaying an image, comprising first and second substrates bonded together by sealing resin with liquid crystal disposed therebetween;

electrodes, mounted on an outer periphery of said first substrate which extends beyond said second substrate, for supplying driving signals from LSI circuits to thin film transistor means mounted on an inner surface of said first substrate confronting said second substrate, said LSI circuits mounted on flexible substrates attached to said first substrate;

protecting resin for covering and protecting said electrodes mounted on said outer periphery of said first substrate; and light shielding means for covering said protecting resin to prevent incident light from entering said liquid crystal display panel through said projected resin, said light shielding means comprising a rectangular-shaped shield.

10. The electro-optical apparatus of claim 9, said rectangular-shaped shield comprising aluminum foil laminated with polyester.

11. The electro-optical apparatus of claim 9, said rectangular-shaped shield comprising colored high polymer film.

12. The electro-optical apparatus of claim 9, further comprising a light source for generating said incident light wherein the electro-optical apparatus is a projection type liquid crystal display device.

13. The electro-optical apparatus of claim 9, further comprising a back-light illumination source for generating said incident light wherein the electro-optical apparatus is a transmission type liquid crystal display device.

* * * * *